(12) United States Patent
Evoy et al.

(10) Patent No.: US 8,004,922 B2
(45) Date of Patent: Aug. 23, 2011

(54) POWER ISLAND WITH INDEPENDENT POWER CHARACTERISTICS FOR MEMORY AND LOGIC

(75) Inventors: David R. Evoy, Chandler, AZ (US); Peter Klapporth, Waalre (NL); Jose J. Pineda De Gyvez, Eindhoven (NL)

(73) Assignee: NXP B.V., Eindhoven (NL)

( * ) Notice: Subject to any disclaimer, the term of this patent is extended or adjusted under 35 U.S.C. 154(b) by 151 days.

(21) Appl. No.: 12/479,517

(22) Filed: Jun. 5, 2009

(65) Prior Publication Data

US 2010/0308897 A1    Dec. 9, 2010

(51) Int. Cl.
*G11C 7/00*    (2006.01)
(52) U.S. Cl. ........ 365/226; 365/154; 365/227; 365/228; 365/229
(58) Field of Classification Search .............. 365/154 X, 365/226 O, 227 X, 228 X, 229 X, 154, 226, 365/227, 228, 229
See application file for complete search history.

(56) References Cited

U.S. PATENT DOCUMENTS

| | | | |
|---|---|---|---|
| 5,436,586 A | 7/1995 | Miyamoto | |
| 7,120,061 B2 * | 10/2006 | Daga | 365/185.23 |
| 7,436,687 B2 * | 10/2008 | Patel | 363/142 |
| 7,542,329 B2 * | 6/2009 | Cheng et al. | 365/154 |
| 2005/0188233 A1 | 8/2005 | Park | |
| 2007/0291569 A1 * | 12/2007 | Hsieh et al. | 365/226 |

FOREIGN PATENT DOCUMENTS

| | | |
|---|---|---|
| GB | 2260661 | 4/1993 |
| WO | 2004/102623 A2 | 11/2004 |
| WO | 2005119532 | 12/2005 |

OTHER PUBLICATIONS

Written Opinion and International Search Report for International Patent Appln. No. PCT/IB2010/052513 (Sep. 23, 2010).
Meijer, M. et al. "On-Chip Digital Power Supply Control for System-On-Chip Applications". Proceedings of the 2005 International Symposium on Lower Power Electronics and Design, (Aug. 2005) pp. 311-314.

* cited by examiner

*Primary Examiner* — VanThu Nguyen

(57) ABSTRACT

A power island for a system-on-a-chip (SoC) includes a first segment, a second segment, and a supply line. The first segment includes a hardware device and operates the hardware device at first power characteristics indicative of at least a first voltage. The second segment includes scalable logic and operates the scalable logic at second power characteristics indicative of at least a second voltage. The second power characteristics of the scalable logic are different from the first power characteristics of the hardware device. The supply line receives an external supply signal (VDD) and directs the external supply signal to both the first segment and the second segment. The second segment changes at least one power characteristic of the external supply signal to operate the scalable logic according to the second power characteristics.

20 Claims, 7 Drawing Sheets

POWER ISLAND WITH INDEPENDENT POWER CHARACTERISTICS FOR MEMORY AND LOGIC

BACKGROUND

A system-on-a-chip (SoC) is an integrated design of hardware and software components that are combined to form a computer on a single integrated circuit. One of the benefits of implementing a SoC is the ability to integrate various types of functionality onto a single chip, rather than interconnecting multiple chips that implement independent functions. For example, a SoC may be used within a mobile telephone to integrate digital, analog, and radio frequency functions on a single chip. This type of integration can save significant space and allow devices to be made smaller and more powerful.

Within a SoC, different hardware and software components (also referred to as IP blocks and modules) are combined to implement specific functionality. One complication with designing a SoC is that some of the components may be designed to operate at different power requirements, including different voltages and/or different operating frequencies. Additionally, it may be useful in some situations to be able to independently control different groups of components, for example, to place certain components in a sleep mode when full functionality of the components is not required.

Given the prospect of consuming a lot of power by operating all of the components within a SoC, many SoC designers are concerned about power efficient technologies. One power management design approach combines components with similar power requirements into groups, which are referred to as power islands or, in some instances, voltage islands. All of the components within a power island typically have similar power characteristics that are unique from the power characteristics of other power islands. Using power islands, the components within each group may be independently switched on or off. By turning off power to a power island during a time that the power island is not required for operation of a device, the total power consumption of the device can be reduced. Then, when the components of that power island are needed again, the power for that power island can be turned on again. In this way, the battery life of a portable electronic device may be significantly increased by suppressing leakage current of components that are temporarily unused.

While conventional SoC implementations that use power islands to implement dynamic voltage and frequency scaling (DVFS) can save a substantial amount of power, there are still limitations on the amount of power that can be saved using conventional power island designs. In particular, some memory components on an island do not scale to the same degree as logic components and, hence, the memory components of the power island can limit the range that the logic can be scaled. More specifically, internal memory typically has a very narrow voltage range, while logic components typically have a wider voltage range. Hence, the narrow voltage range of the memory limits the voltage range that can be applied to the logic components in the same power island. Accordingly, the memory components which limit the amount of logic scaling also limit the ability to save power through DVFS.

In contrast to embodiments which limit the voltage range of the logic to match the voltage range of the memory, some conventional embodiments may use memory designed for a wider range of voltages. However, designing memory for a wider voltage range prevents optimal memory design and generally results in memory with inferior power and/or speed performance. Also, memory that is designed for a wider voltage range generally uses larger memory cells, which increases the size of the power island.

SUMMARY

Embodiments of an apparatus are described. In one embodiment, the apparatus is a power island for a system-on-a-chip (SoC). An embodiment of the power island includes a first segment, a second segment, and a supply line. The first segment includes a hardware device which operates at first power characteristics indicative of at least a first voltage. The second segment includes scalable logic which operates at second power characteristics indicative of at least a second voltage. The second power characteristics of the scalable logic are different from the first power characteristics of the hardware device. The supply line receives an external supply signal, VDD, and directs the external supply signal to both the first segment and the second segment. The second segment changes at least one power characteristic of the external supply signal to operate the scalable logic according to the second power characteristics. Other embodiments of the apparatus are also described.

Embodiments of a system are also described. In one embodiment, the system is a SoC. An embodiment of the SoC includes a plurality of power controls and a plurality of power islands. Each power island is coupled to a corresponding power control. Each power control supplies a unique supply signal, VDD, having a supply voltage. Each power island receives a single unique supply signal from the corresponding power control. Each power island includes a first segment and a second segment. The first segment includes a first module which operates at first power characteristics. The first power characteristics include the supply voltage of the unique supply signal from the corresponding power control. The second segment includes a second module which operates at second power characteristics that are at least partially different from the first power characteristics of the first segment. Other embodiments of the system are also described.

Embodiments of a method are also described. In one embodiment, the method is a method for making a power island for a SoC. An embodiment of the method includes coupling a memory device to a supply line of the power island. The supply line receives an external supply signal, VDD, from an external power control to operate the memory device according to first power characteristics. The method also includes coupling a supply power converter to the supply line of the power island. The supply power converter changes at least one power characteristic of the external supply signal to supply an internal supply signal, VDDi, to a logic module on the power island according to second power characteristics that are at least partially different from the first power characteristics. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
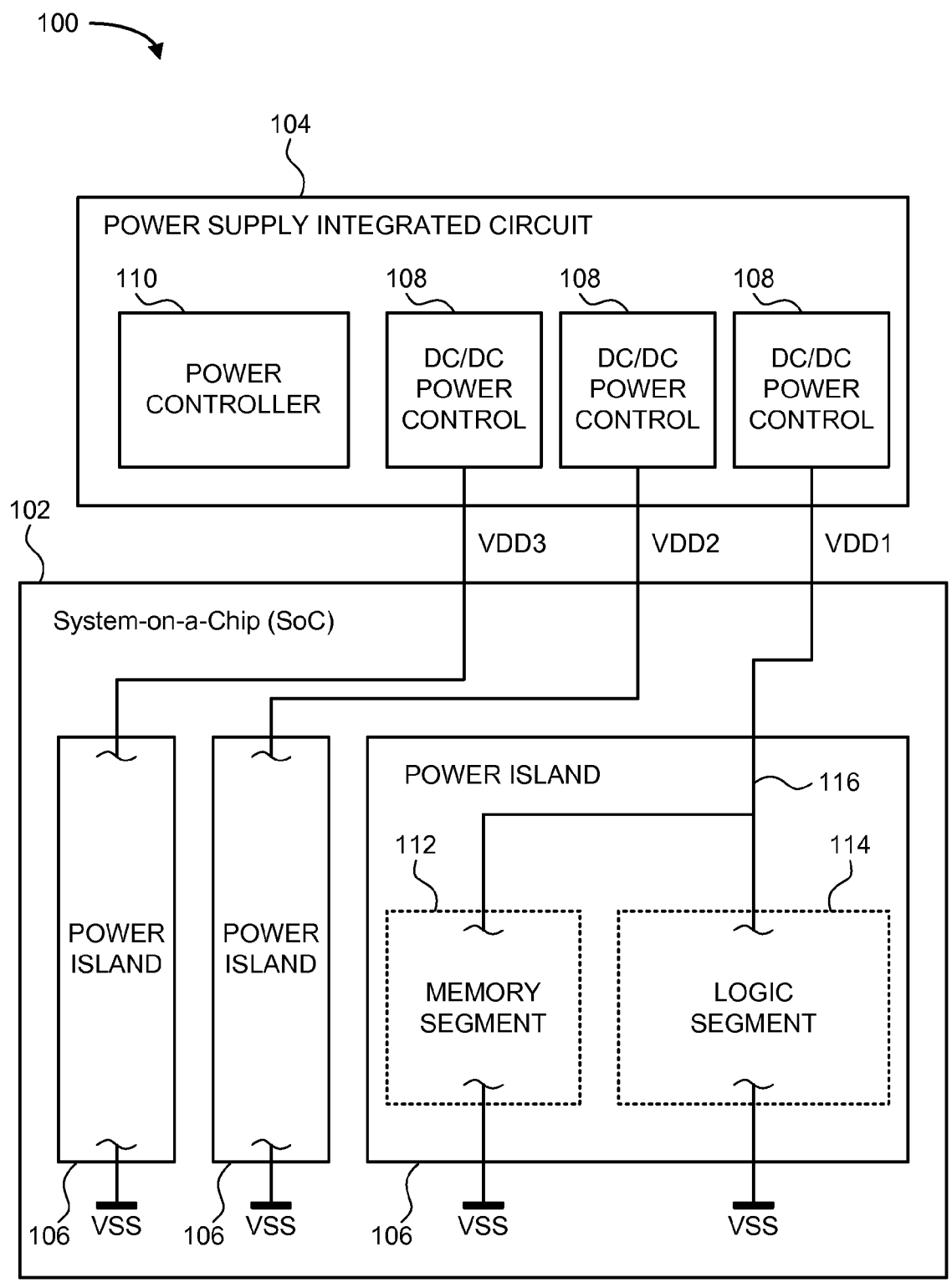
FIG. 1 depicts a schematic block diagram of one embodiment of a circuit with a system-on-a-chip (SoC) and a power supply integrated circuit (IC).

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments relate to implementations of a system-on-a-chip (SoC). In general, embodiments of the SoC include at least one power island which has multiple components. Each of the components operates at specific power characteristics, including a supply voltage and an operating frequency. Alternatively, some of the components may be capable of operating within a range of power characteristics. In certain embodiments, some of the components of the power island operate at a first set of power characteristics, while other components of the power island operate at a second set of power characteristics. In other words, different components of the same power island can be operated at different supply voltages and/or operating frequencies. As one example, one embodiment of a power island operates a memory device (e.g., random access memory (RAM)) using a supply signal provided from an external signal source, while logic on the power island is operated using an adjustable voltage derived from, but different than, the external supply signal. Thus, the memory device is directly supplied by the external signal, while the logic is fed from a different internal signal which is derived from the external signal. Consequently, in some embodiments, the RAM and logic do not need level shifters (despite being at different voltages) because the switching threshold is at half the absolute supply voltage for both of them, for example. The half supply voltage switching threshold is a result of a symmetric voltage drop and voltage rise at the header and footer of the logic, respectively. Without this, logic level conversion would be cumbersome.

For reference, it should also be noted that the power requirements of different components can vary based on the frequency at which the components operate. Although an ideal supply is a direct current (DC) voltage, the supply voltage typically changes in a dynamic way, which is referred to as a frequency. Hence, the supply voltage changes to match the power that is required for each component. Further details of various embodiments are described below, with reference to the appended drawings.

FIG. 1 depicts a schematic block diagram of one embodiment of a circuit 100 with a SoC 102 and a power supply integrated circuit (IC) 104. In general, the power supply IC 104 provides power to various components of the SoC 102. Although the circuit 100 is shown and described with certain components and functionality, other embodiments of the circuit 100 may include fewer or more components to implement less or more functionality.

The illustrated power supply IC 104 includes multiple DC/DC power controls 108. In one embodiment, DC/DC power controls 108 are implemented as DC-to-DC converters, which generate supply signals with specific supply voltages. In one embodiment, the DC/DC power controls 108 each generate a unique supply signal (VDD) having a specific supply voltage. For example, the three DC/DC power controls 108 shown in FIG. 1 are depicted as generating three different supply signals: VDD1, VDD2, and VDD3. In other embodiments, different DC/DC power controls 108 may generate supply signals with the same or similar supply voltages. Also, in some embodiments, a single DC/DC power control 108 may supply multiple components on the SoC 102.

The power supply IC 104 also includes a power controller 110. In one embodiment, the power controller 110 is coupled to each of the DC/DC power controls 108. The power controller 110 controls when each DC/DC power control 108 supplies the corresponding supply signal to the SoC 102. Additionally, the power controller 110 may control the supply voltage of the supply signal generated by each of the DC/DC power controls 108. In some embodiments, the power controller 110 may vary over time the supply voltage of a supply signal generated by one of the DC/DC power controls 108.

The illustrated SoC 102 includes several individual power islands 106. Each power island 106 may have separate power characteristics, or requirements, for operation of the components specific to each power island 106. For example, each power island 106 may have specific requirements for the supply voltage at various operating frequencies for the individual islands. In the illustrated embodiment, each of the three power islands 106 receives a separate supply signal (e.g., VDD1, VDD2, or VDD3) from corresponding DC/DC power controls 108 of the power supply IC 104. Also, each of the power islands 106 is connected to a reference signal, VSS. Although the illustrated power islands 106 connect to separate nodes of the same reference signal, VSS, other embodiments of the SoC 102 may implement two or more distinct reference sources. Alternatively, multiple power islands 106 may connect to the same node of a single reference signal, VSS.

In the depicted embodiment, one of the power islands 106 includes a memory segment 112 and a logic segment 114. Both the memory segment 112 and the logic segment 114 are connected to the same supply line 116 from one of the DC/DC power controls 108 of the power supply IC 104. By virtue of this common supply line 116, both the memory segment 112 and the logic segment 114 of the power island 106 receive the same supply signal. Hence, the same supply voltage is supplied to both the memory segment 112 and the logic segment 114 of the power island 106.

In one embodiment, the memory segment 112 operates at a first set of power characteristics, including a specific supply voltage for a specific operating frequency, either alone or in combination with other power requirements. In contrast, at least a portion of the logic segment 114 operates at a second set of power characteristics, which is at least partially different from the first power characteristics of the memory segment 112. For example, the logic segment 114 may operate at a supply voltage that is different from the supply voltage of the memory segment 112. As another example, the logic segment 114 may operate at an operating frequency that is different from the operating frequency of the memory segment 112. Other embodiments may have other distinct power characteristics.

Although the segments of the power island 106 shown in FIG. 1 are specifically designated as a memory segment 112 and a logic segment 114, other embodiments of the power island 106 may implement other segments, or components, which may be considered other types of hardware, components, modules, blocks, etc. Thus, the references herein to the memory segment 112 and the logic segment 114 should be understood as representative examples of specific types of segments, although other embodiments of the power island 106 may implement other types of segments.

Some embodiments of the logic segment 114 are scalable logic which scales the performance of the logic segment 114 according to the voltage level. As an example, scalable logic is faster and consumes more power at higher voltage levels, but can also perform more slowly and consume less power at lower voltage levels. Additionally, although some embodiments of the logic segment 114 are described herein as scalable logic, other embodiments of the logic segment 114 may include other types of logic.

As described above, the supply line 116 provides the same supply voltage to both the memory segment 112 and the logic segment 114 of the power island 106. However, in some embodiments, the logic segment 114 includes functionality to change at least one power characteristic of the external supply signal, VDD, to operate the scalable logic according to the second power characteristics. Furthermore, in some embodiments, the first power characteristics of the memory segment 112 are variable to operate the memory segment 112 over a first range of power characteristics, and the second power characteristics of the logic segment 114 are separately variable, independent of the first power characteristics, to operate at least a portion of the logic segment 114 over a second range of power characteristics. For example, the first power characteristics of the memory device 112 may be externally controlled from outside the power island 106 (e.g., by one of the DC/DC power controls 108), and the second power characteristics of the logic segment 114 may be internally controlled from inside the power island 106, as explained below. Additionally, in some embodiments, the switching threshold of the segment with the lower supply voltage is at the same switching threshold voltage as the other segment as a result of simultaneously lowering a power supply and raising a ground potential.

Figure 2:
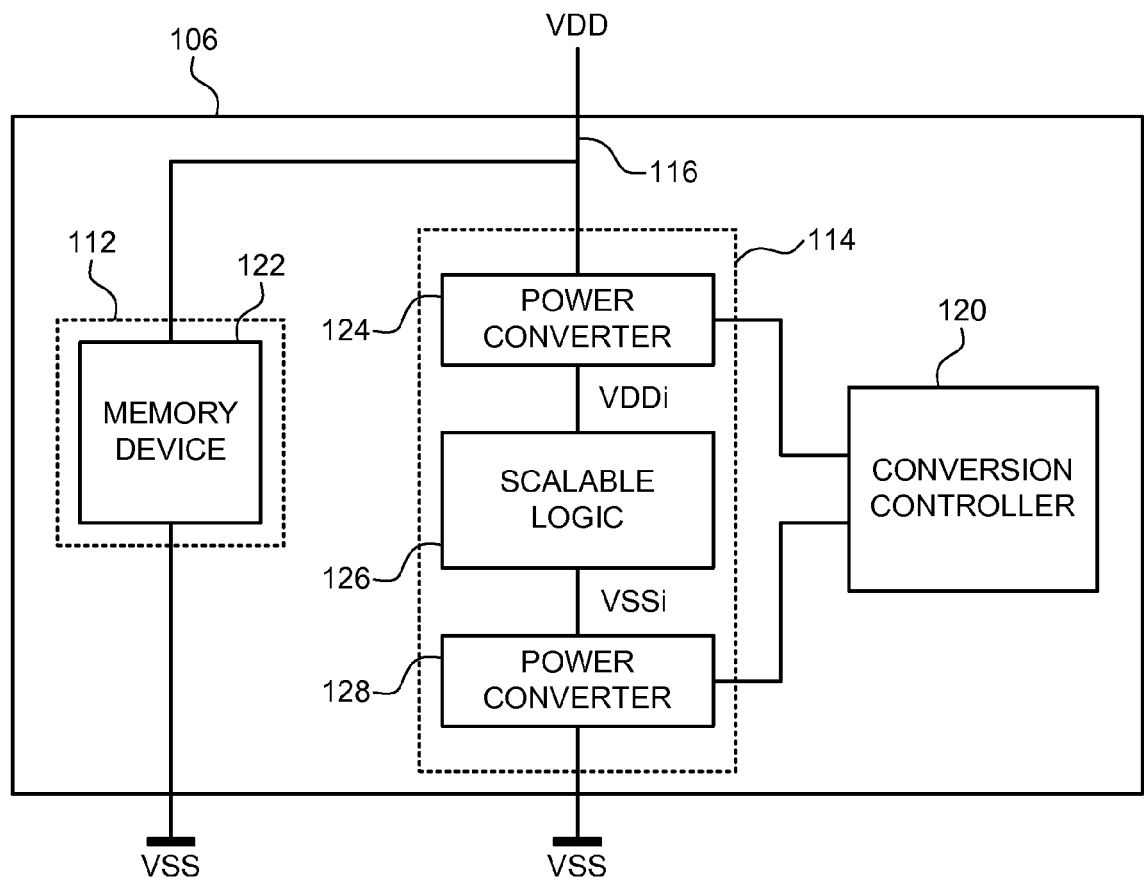
FIG. 2 depicts a schematic block diagram of another embodiment of the power island of the SoC of FIG. 1.

FIG. 2 depicts a schematic block diagram of another embodiment of the power island 106 of the SoC 102 of FIG. 1. The illustrated power island 106 includes the memory segment 112, the logic segment 114, the common supply line 116, and a conversion controller 120. More specifically, the memory segment 112 includes a memory device 122. Also, the logic segment 114 includes a supply power converter 124, scalable logic 126, and a reference power converter 128. Although the power island 106 is shown and described with certain components and functionality, other embodiments of the power island 106 may include fewer or more components to implement less or more functionality.

In one embodiment, the memory device 122 used in the power island 106 is a self-contained buffer, similar to a first-in first-out (FIFO) block that is in common use and is often used internal to logic blocks to buffer data. Another example of the memory device 122 is a video line buffer or frame buffer. Other embodiments may implement other types of memory devices 122.

In one embodiment, within the context of a video decoder that buffers a frame of video, the scalable logic 126 is used for the decode operation, while the memory device 122 is used for buffering the line. In another example, a disk drive with a read buffer may be implemented, in which the buffer itself is implemented in the memory device 122, and the control logic, error correction, pre-read and other functions could be implemented in the scalable logic 126 within the same power island 106.

In one embodiment, the supply power converter 124 is coupled between the supply line 116 of the power island 106 and the scalable logic 126. The supply power converter 124 may convert a supply voltage of the external supply signal, VDD, from the first power characteristics to the second power characteristics. For example, the supply voltage converter 124 may generate an internal supply signal, VDDi, which has a supply voltage that is different from the supply voltage of the external supply signal, VDD. Similarly, the reference power converter 128 coupled between the reference line of the power island 106 and the scalable logic 126 converts a reference voltage, VSS, of the reference signal from the first power characteristics to the second power characteristics. For example, the reference voltage converter 128 may generate an internal reference voltage, VSSi, which has a reference voltage or another power characteristic that is different from the corresponding power characteristics of the reference signal, VSS. Thus, the supply and reference power converters 124 and 128 convert the first power requirements to the second power requirements by altering the power supplied at VDD and VSS. Optionally, the supply and reference power converters 124 and 128 also alter the frequency supplied to the scalable logic 126.

In one embodiment, the conversion controller 120 is coupled to each of the supply and reference power converters 124 and 128. In general, the conversion controller 120 controls when and how the supply and reference power converters 124 and 128 change the power characteristics of the supply and reference signals, respectively. Although the conversion controller 120 is shown on the power island 106 with the memory segment 112 and the logic segment 114, other embodiments of the power island 106 may exclude the conversion controller 120, in which case another component or device outside of the power island 106 may control the operation of the supply and reference power converters 124 and 128.

Figure 3:
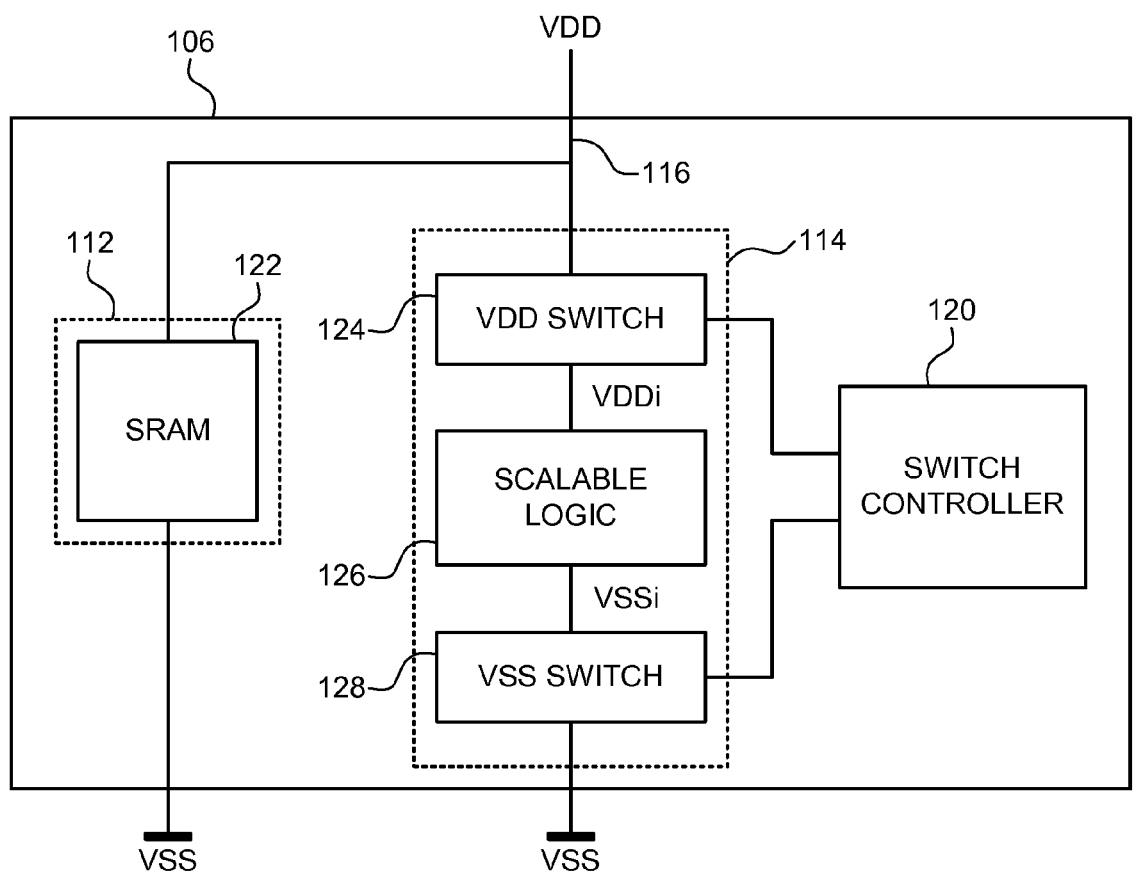
FIG. 3 depicts a schematic block diagram of another embodiment of the power island of the SoC of FIG. 1.

FIG. 3 depicts a schematic block diagram of another embodiment of the power island 106 of the SoC 102 of FIG. 1. Specifically, the power island 106 shown in FIG. 3 is substantially similar to the power island 106 shown in FIG. 2 and described above. However, the power island 106 of FIG. 3 specifically includes a static RAM (SRAM) as the memory device 122 of the memory segment 112. Also, the logic segment 114 includes switches as specific types of power converters. In particular, the supply power converter 124 of FIG. 2 is implemented in FIG. 3 as a VDD switch, and the reference power converter 128 of FIG. 2 is implemented in FIG. 3 as a VSS switch. Hence, the conversion controller 120 of FIG. 2 is implemented in FIG. 3 as a switch controller.

In one embodiment, the VDD and VSS switches 124 and 128 include added resistance which causes corresponding voltage drops and changes the supply and reference voltages according to the first and second power characteristics.

This adds communication between the various components internal to the power island 106. As one example, if the power island is at 1.0 V, then the halfway point, where the complementary metal-oxide semiconductor (CMOS) logic typically switches, will be at about 0.5 V. Signals greater than 0.5 V represent a 1, and signals less than 0.5 V represent a 0. In one embodiment, if both switches (VDD and VSS) drop 0.2 V, then the high and low voltages would be 0.8 V and 0.2 V, respectively. The middle of this new range is still 0.5 V, so signals above 0.5 V still represent a 1, and signals below 0.5 V still represent a 0. By retaining a common switch point, communication between the scalable logic 126 and the memory device 122 (e.g., RAM) is maintained for multiple voltage settings, and communication between islands of different voltages is simplified because level translators are not necessarily required.

In one embodiment, the switch controller 120 controls the VDD switch 124 and the VSS switch 128 to change the unique supply signal, VDD, and the reference signal, VSS, according to the second power characteristics of the scalable logic 126. In this way, the switch controller 120 can vary the second power characteristics of the logic segment 114 from inside the power island 106.

Figure 4:
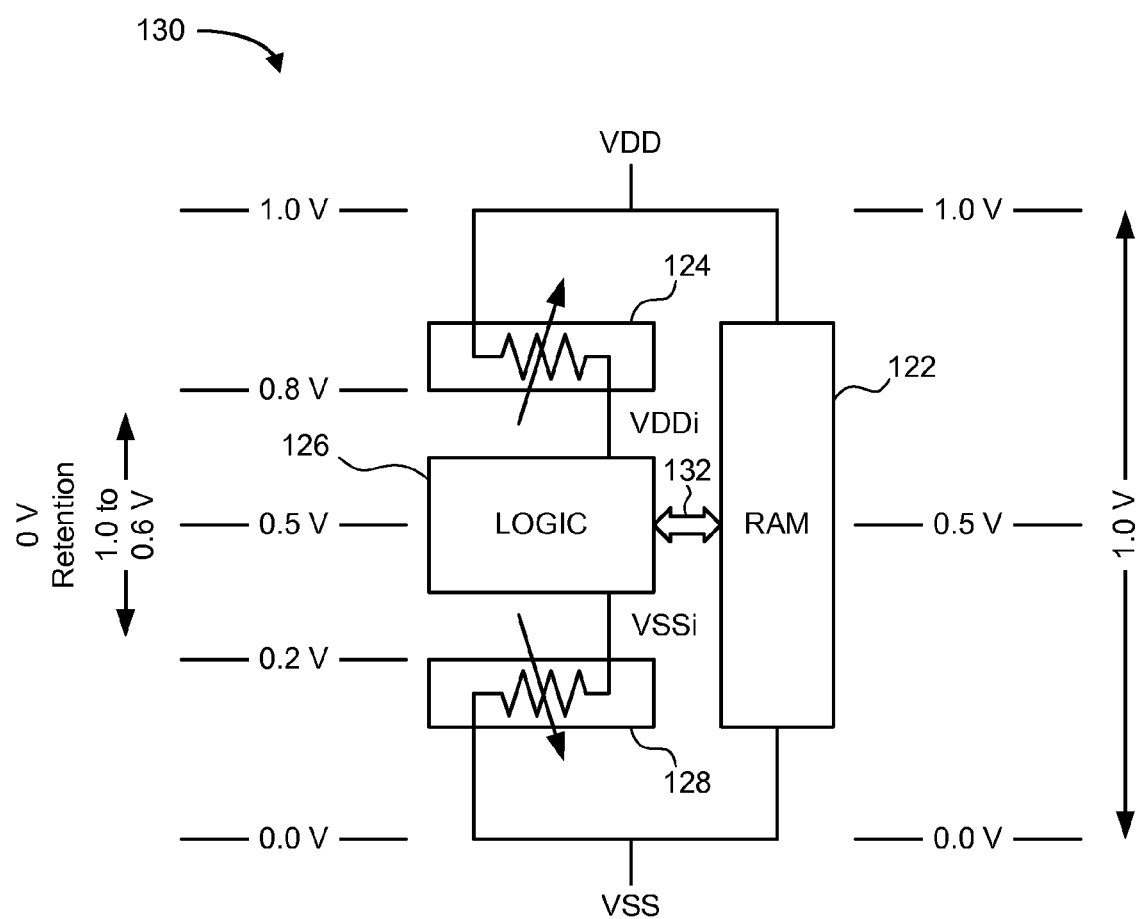
FIG. 4 depicts a schematic voltage diagram of operating voltage levels for one embodiment of the power island of FIG. 3.

FIG. 4 depicts a schematic voltage diagram 130 of operating voltage levels for one embodiment of the power island 106 of FIG. 3. The illustrated power island 106 includes the memory device 122 (e.g., RAM), the logic 126, and the switches 124 and 128 which are depicted as variable resistors. The illustrated power island 106 also includes a data bus 132 coupled between the memory device 122 and the scalable logic 126. The voltage levels on the right side of the memory device 122 correspond to operating voltages of the memory device 122, while the voltage levels on the left side of the scalable logic 126 correspond to operating voltages of the scalable logic 126. As one example, during a write operation the scalable logic 126 may drive the memory device 122 with voltages of 0.2 V and 0.8 V. This works because the memory device 122 has a voltage threshold of 0.5 V. In another embodiment, the memory device 122 drives the scalable logic 126 with voltages of 0.0 V and 0.8 V. This works because the scalable logic 126 also has a voltage threshold of 0.5 V.

Figure 5:
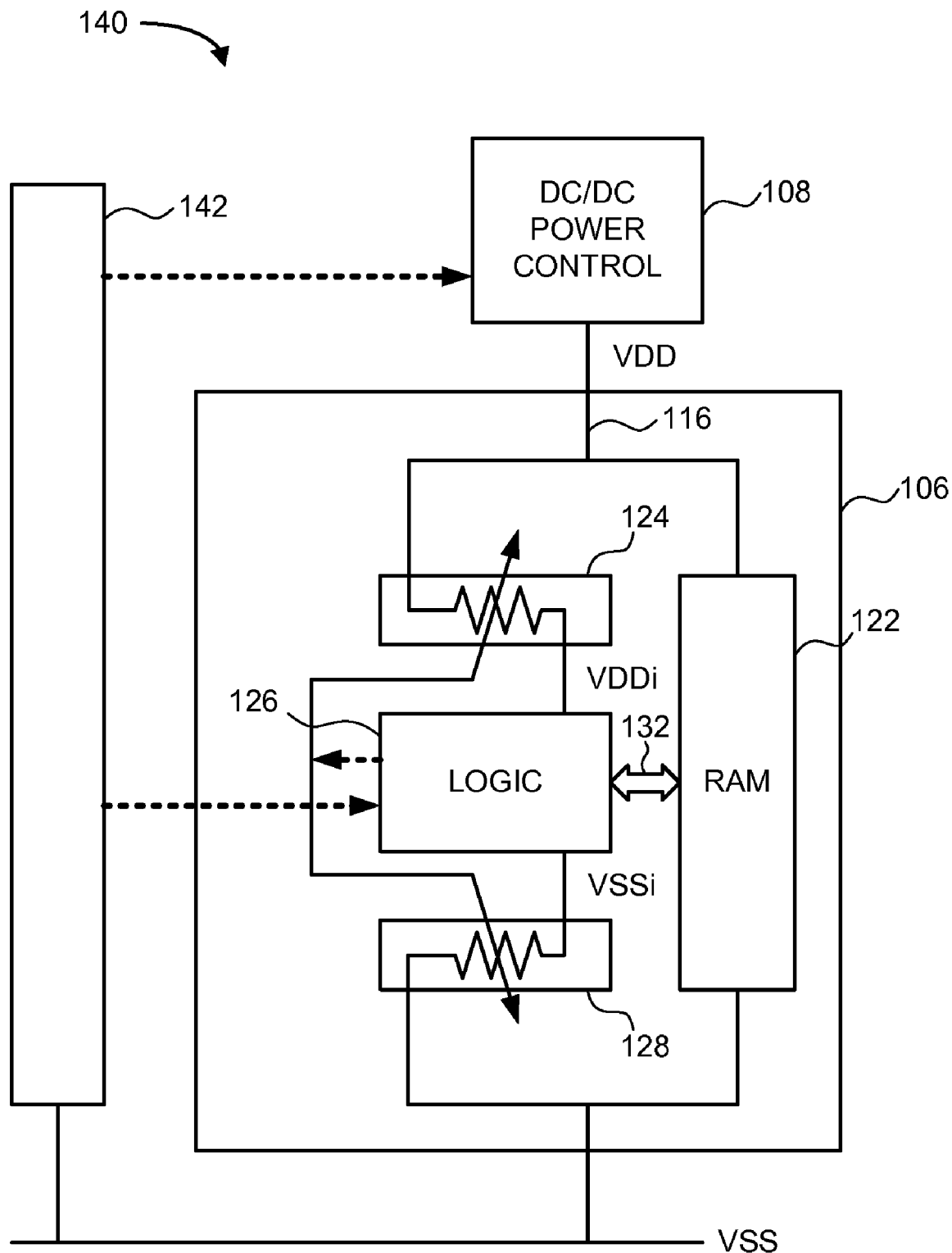
FIG. 5 depicts a schematic block diagram of one embodiment of a system for controlling the power island of FIG. 4.

FIG. 5 depicts a schematic block diagram of one embodiment of a system 140 for controlling the power island 106 of FIG. 4. The illustrated system 140 includes the power island 106, a DC/DC power control 108, and a power control module 142.

Figure 6:
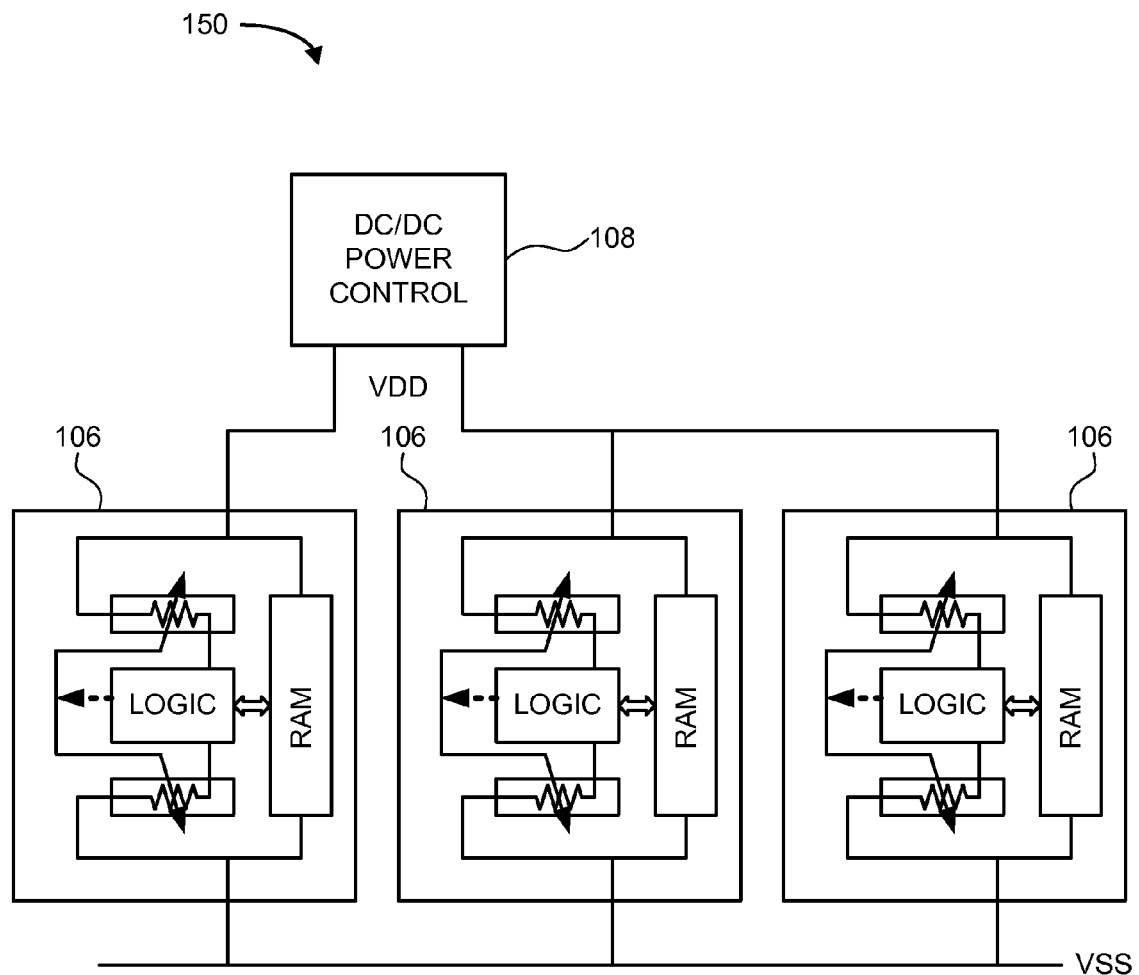
FIG. 6 depicts a schematic block diagram of one embodiment of a system for controlling multiple power islands.

FIG. 6 depicts a schematic block diagram of one embodiment of a system 150 for controlling multiple power islands 106. In the illustrated embodiment, a single DC/DC power control 108 is coupled to a plurality of power islands 106. In this way, the DC/DC power control 108 may provide the same or different supply signals to multiple power islands 106.

Figure 7:
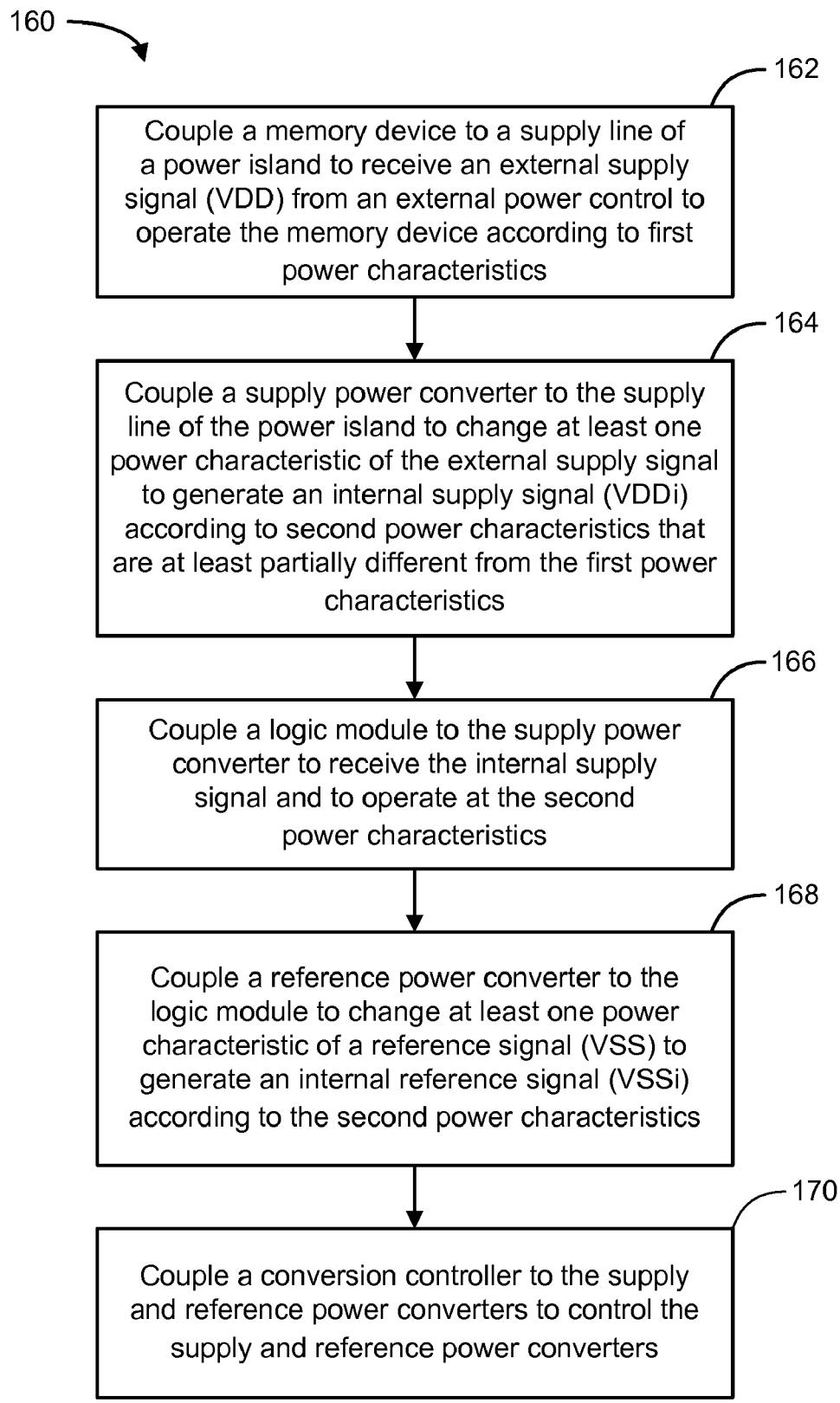
FIG. 7 depicts a flow chart diagram of one embodiment of a method for making a power island for a SoC.

FIG. 7 depicts a flow chart diagram of one embodiment of a method 160 for making a power island 106 for a SoC 102. Although the method 160 is described in conjunction with the power island 106 of the SoC 102 of FIG. 1, embodiments of the method 160 may be implemented with other types of power islands and/or SoC implementations.

At block 162, a memory device 122 is coupled to a supply line 116 of the power island 106. As explained above, the supply line 116 receives an external supply signal, VDD, from an external power control 108. The power island 106 uses the supply signal, VDD, to operate the memory device 122 according to first power characteristics. At block 164, a supply power converter 124 is coupled to the supply line 116 of the power island 106. The supply power converter 124 is configured to change at least one power characteristic of the external supply signal, VDD, to generate an internal supply signal, VDDi, according to second power characteristics that are at least partially different from the first power characteristics.

At block 166, a logic module 126 is coupled to the supply power converter 124. The logic module 126 receives the internal supply signal, VDDi, and operates according to the second power characteristics. At block 168, a reference power converter 128 is coupled to the logic module 126. The reference power converter 128 changes at least one power characteristic of a reference signal, VSS, to generate an internal reference signal, VSSi, according to the second power characteristics. At block 168, a conversion controller 120 is coupled to the supply power converter 124 and to the reference power converter 128. As explained above, the conversion controller 120 controls the supply power converter 124 and the reference power converter 128 to generate the internal supply signal, VDDi, and the internal reference signal, VSSi, respectively, according to the second power characteristics. The depicted method 160 then ends.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A power island for a system-on-a-chip (SoC), the power island comprising:
   a first segment comprising a hardware device, the first segment to operate the hardware device at first power characteristics indicative of at least a first voltage;
   a second segment comprising scalable logic, the second segment to operate the scalable logic at second power characteristics indicative of at least a second voltage, wherein the second power characteristics of the scalable logic are different from the first power characteristics of the hardware device;
   a supply line to receive an external supply signal (VDD) and to direct the external supply signal to both the first segment and the second segment, wherein the second segment is configured to change at least one power characteristic of the external supply signal to operate the scalable logic according to the second power characteristics;
   a supply power converter coupled between the supply line and the scalable logic, wherein the supply power converter is configured to convert a supply voltage of the external supply signal from the first power characteristics to the second power characteristics; and
   a conversion controller coupled to the supply power converter, wherein the conversion controller is configured to control the supply power converter to change the external supply signal according to the second power characteristics of the scalable logic.

2. The power island of claim 1, wherein the first power characteristics of the hardware device are variable to operate the hardware device over a first range of power characteristics, and the second power characteristics of the scalable logic are separately variable, independent of the first power characteristics, to operate the scalable logic over a second range of power characteristics.

3. The power island of claim 2, wherein the first power characteristics of the hardware device are externally controlled from outside the power island, and the second power characteristics of the scalable logic are internally controlled from inside the power island.

4. The power island of claim 1, further comprising a reference line to receive a reference signal (VSS), wherein the second segment further comprises a reference power converter coupled between the reference line of the power island and the scalable logic, wherein the reference power converter is configured to convert a reference voltage of the reference signal from the first power characteristics to the second power characteristics, and wherein the conversion controller is coupled to the reference power converter, wherein the conversion controller is configured to control the reference power converter to change the external reference signal according to the second power characteristics of the scalable logic.

5. The power island of claim 4, wherein:
   the supply power converter comprises a VDD switch with a first added resistance to cause a first voltage drop and reduce the supply voltage of the external supply signal to the second voltage of the second power characteristics; and
   the reference power converter comprises a VSS switch with a second added resistance to cause a second voltage drop and change the reference voltage consistent with the second power characteristics.

6. The power island of claim 5, wherein the conversion controller comprises a switch controller coupled to the VDD switch and the VSS switch, wherein the switch controller is configured to control the VDD switch and the VSS switch to change the external supply signal and the reference signal according to the second power characteristics of the scalable logic.

7. The power island of claim 1, wherein the hardware device comprises a memory device.

8. The power island of claim 7, wherein the memory device comprises a static random access memory (SRAM) device.

9. The power island of claim 1, wherein a switching threshold of the first or second segment with the lower supply voltage is at a same switching threshold voltage as the other segment.

10. The power island of claim 9, wherein the switching threshold of the first or second segment with the lower supply voltage is at the same switching threshold voltage as the other segment as a result of simultaneously lowering a power supply and raising a ground potential.

11. A system-on-a-chip (SoC) comprising:
    a plurality of power controls, wherein each power control is configured to supply a unique supply signal (VDD) having a supply voltage; and
    a plurality of power islands coupled to the plurality of power controls, wherein each power island is coupled to a corresponding power control to receive a single unique supply signal from the corresponding power control, wherein each power island comprises:
      a first segment comprising a first module which operates at first power characteristics, wherein the first power characteristics include the supply voltage of the unique supply signal from the corresponding power control;
      a second segment comprising a second module which operates at second power characteristics that are at least partially different from the first power characteristics of the first segment, the second segment further comprising;
        a supply power converter coupled between the corresponding power control and second module, wherein the supply power converter is configured to convert the unique supply signal (VDD) from the first power characteristics to the second power characteristics;
        a reference power converter coupled between the second module and a reference signal (VSS), wherein the reference power converter is configured to convert a reference voltage from the first power characteristics to the second power characteristics; and
        a conversion controller coupled to the supply power converter and the reference power converter, wherein the conversion controller is configured to control the supply power converter and the reference power converter to change the unique supply signal (VDD) and the reference signal (VSS) according to the second power characteristics of the second module.

12. The SoC of claim 11, wherein each power island further comprises a single supply line to receive the unique supply signal from the corresponding power control, wherein the supply line is coupled to both the first and second segments to direct the unique supply signal to both the first and second segments.

13. The SoC of claim 12, wherein:
the first module comprises a memory device to operate according to the first power characteristics; and
the second module comprises scalable logic to operate according to the second power characteristics, wherein a second voltage of the second power characteristics is lower than a first voltage of the first power characteristics.

14. The SoC of claim 13, wherein the second segment further comprises:
a VDD switch coupled between the supply line and the scalable logic, wherein VDD switch comprises a first added resistance to cause a first voltage drop and reduce the first voltage of the first power characteristics to the second voltage of the second power characteristics; and
a VSS switch coupled between the reference voltage (VSS) and the scalable logic, wherein the VSS switch comprises a second added resistance to cause a second voltage drop and change the reference voltage consistent with the second power characteristics.

15. The SoC of claim 14, wherein the conversion controller comprises a switch controller coupled to the VDD switch and the VSS switch, wherein the switch controller is configured to control the VDD switch and the VSS switch to change the unique supply signal and the reference signal according to the second power characteristics of the scalable logic.

16. The SoC of claim 15, further comprising a power controller coupled to the plurality of power controls, wherein the power controller is configured to control when each power control supplies the corresponding unique supply signal to the corresponding power island, wherein:
the power controller is further configured to vary the first power characteristics of the first segment from outside the power island; and
the switch controller is further configured to vary the second power characteristics of the second segment from inside the power island.

17. A method for making a power island for a system-on-a-chip (SoC), the method comprising:
coupling a memory device to a supply line of the power island, wherein the supply line is configured to receive an external supply signal (VDD) from an external power control to operate the memory device according to first power characteristics;
coupling a supply power converter to the supply line of the power island, wherein the supply power converter is configured to change at least one power characteristic of the external supply signal to supply an internal supply signal (VDDi) to a logic module on the power island according to second power characteristics that are at least partially different from the first power characteristics; and
coupling a conversion controller to the supply power converter, wherein the conversion controller is configured to control the supply power converter to generate the internal supply signal (VDDi) according to the second power characteristics.

18. The method of claim 17, further comprising:
coupling the logic module to the supply power converter, wherein the logic module is configured to operate at the second power characteristics;
coupling a reference power converter to the logic module, wherein the reference power converter is configured to change at least one power characteristic of a reference signal (VSS) to generate an internal reference signal (VSSi) according to the second power characteristics; and
coupling the conversion controller to the the reference power converter, wherein the conversion controller is configured to control the reference power converter to generate the internal reference signal (VSSi) according to the second power characteristics.

19. The power island of claim 4, wherein the conversion controller is configured to vary the second power characteristics of the scalable logic from outside the power island.

20. The SoC of claim 11, wherein the conversion controller is configured to control the supply power converter and the reference power converter from a device outside the power island.

* * * * *